United States Patent [19]

Hasse

[11] Patent Number: 4,634,048

[45] Date of Patent: Jan. 6, 1987

[54] LOW-PROFILE ENCAPSULATED DIAPHRAGM VALVE FOR THE THERMAL CONTROL OF CONDENSATE WATER DRAINAGE

[75] Inventor: Erich Hasse, Bremen, Fed. Rep. of Germany

[73] Assignee: ASCA Equipamentos Industriais LTDA., Rio de Janeiro, Brazil

[21] Appl. No.: 725,098

[22] Filed: Apr. 19, 1985

[30] Foreign Application Priority Data

Apr. 25, 1984 [DE] Fed. Rep. of Germany ....... 3415429
Apr. 25, 1984 [DE] Fed. Rep. of Germany ....... 3415430

[51] Int. Cl.$^4$ ................................................ F16T 1/02
[52] U.S. Cl. .................................. 236/58; 137/533.11; 236/99 R
[58] Field of Search ............. 236/56, 58, 93 A, 99 R; 137/185, 200, 202, 614.2, 533.11

[56] References Cited

U.S. PATENT DOCUMENTS

| | | | |
|---|---|---|---|
| 757,873 | 4/1904 | Allen | 137/202 X |
| 1,564,624 | 12/1925 | Riley | 137/533.11 X |
| 2,053,641 | 9/1936 | Spade | 137/185 |
| 2,289,020 | 7/1942 | Jones | 236/58 |
| 2,396,400 | 3/1946 | Vitagliano | 137/200 X |
| 2,432,838 | 12/1947 | Van Zwienen | 236/56 |
| 2,455,305 | 11/1948 | Heva | 137/614.2 X |
| 2,842,155 | 7/1958 | Peters | 236/93 A X |
| 3,698,633 | 10/1972 | Lingnan | 236/99 R |
| 4,161,278 | 7/1979 | Klann et al. | 236/56 |
| 4,244,518 | 1/1981 | Foller | 236/58 |

Primary Examiner—William E. Wayner

[57] ABSTRACT

The invention relates to a volatile-liquid-filled, encapsulated diaphragm valve for the thermal control of condensate water drains. The capsule consists of two unhardened turnings which are welded together, the lower capsule part having a threaded stem to be screwed into the bore of the condensate drain. In the outlet passage in the threaded stem of the lower capsule part there is press-fitted a hardened valve seat body having valve seats at both ends, the seat cone on the outlet side, which cooperates with a check valve body, being prolonged in the outlet passage all the way to the end of the threaded stem, terminating in a narrow edge. The entire conical flare forms the chamber for the movement of the check valve body, which is limited by a sieve plate. Above the threaded stem the capsule bottom part's diameter reaches all the way to the diaphragm clamping zone, while the lateral inlet ports in the bottom part consist of bores having an inside diameter corresponding to the wall thickness.

5 Claims, 3 Drawing Figures

LOW-PROFILE ENCAPSULATED DIAPHRAGM VALVE FOR THE THERMAL CONTROL OF CONDENSATE WATER DRAINAGE

The invention relates to a low-profile encapsulated diaphragm valve filled with a volatile liquid for the thermal control of condensate water drainage. Such a valve consists of two massive capsule halves welded together at the outer margins with a diaphragm held between them in a hermetic and leak-proof manner which bears a valve body whereby it cooperates with the valve seat; the upper capsule half is of a hat-shaped configuration and together with the diaphragm forms a chamber for containing the volatile liquid, while the lower half has a screw-threaded stem which can be threaded into the bore of the drain casing and is provided with lateral ports for the admission of the condensate and with the valve seat body which has a controlled outlet opening. An encapsulated diaphragm valve of this kind is disclosed, for example, in German Federal Patent DE-PS No. 31 24 023.

These known encapsulated diaphragm valves have been made heretofore of fine steel castings or have been forged from steel. The finish machining makes their manufacture very difficult and expensive. Also, the high reject rate caused by cracking when the margins are welded together makes the known encapsulated diaphragm valves unsuitable for mass production.

Furthermore, a hexagonal drive must be provided on these prior-art capsules for engagement by a wrench for the purpose of driving them into or removing them from the drain casing. Furthermore, the diaphragms are subject in use to severe wear, so that frequent replacement of the encapsulated valves has been necessary.

It is the aim of the invention, therefore, to reduce production costs by appropriate measures, to reduce the rate of rejection, and to improve precision of operation and extend valve life. It is also the object of the invention to design the diaphragm valve capsule such that it will permit engagement by a tool for installation and removal without additionally incorporating a square or hexagonal drive. At the same time, these measures must appreciably extend the useful life of the diaphragm within the capsule.

THE INVENTION

These aims are achieved in accordance with the invention by the following features:

(a) the capsule consists of unhardened turnings which can be produced on automatic lathes, (b) a valve seat body is tightly held by a press fit in the bore in the bottom capsule half and has a sealing surface on the inlet side and one on the outlet side cooperating with a valve body in each case, (c) the outlet side of the valve seat body cooperates with a check valve body whose opening movement is limited by a sieve plate, (d) the through-bore of the valve seat body flares uniformly on the outlet side, while the flare is prolonged conically through the threaded stem all the way to its bottom end, (e) the entire conical flare of the outlet passage through the threaded stem simultaneously serves as the chamber for accommodating the movement of the check valve body, (f) the massive bottom half of the capsule, which is provided with a threaded stem, consists, above the threaded stem, in the area of the inlet ports, of a cylindrical body reaching in diameter approximately to the diaphragm clamping zone, whose wall thickness in this area corresponds approximately to the radius of the central working chamber for the upwardly and downwardly movable valve body and the confronting valve seat.

It has been possible by the invention to eliminate the causes which adversely affect the durability of the diaphragm. The manufacture of the encapsulated diaphragm valves in large numbers can be performed much more expeditiously on the basis of the proposed measures.

Making the diaphragm capsule from turnings that can be produced on automatic lathes permits a substantially greater precision of production, and a design providing for optimum operation. The improvement in durability results on the one hand from the fact that the unhardened free-cutting steel is better for welding without producing tension cracks which in the known drains of this kind gradually lead to losses of the volatile liquid, so that drains made with such capsules become unusable after a short time of operation. On the other hand, making the diaphragm valve capsule of unhardened free-cutting steel offers not only the advantage that the valve seat, which is subject to wear, is on a valve seat body consisting of high-quality, hardened and ground material, but also that the surfaces at which the diaphragm is held between the upper and lower halves of the capsule can be brought so close to the valve that only a small annular gap is left between the inner wall of the casing and the valve body to permit the movement of the latter. By this enlargement of the diaphragm contact areas, which is made possible only by the use of a valve seat body, since in the case of a valve seat turned from the solid the space needed for the engagement of the tool would be taken from the diaphragm contact area, the durability of the diaphragm is considerably improved.

Also, the press-fitted valve seat body permits the provision of a safety check valve on the outlet side, such as is used in the prior art on other drains. The chamber for the movement of the check valve body, which consists preferably of a ball, is of a conical configuration and continues to flare uniformly through the threaded stem of the bottom half of the capsule, resulting in an easier outflow of the condensate and of the expanding steam. In the known configurations, in which the outflow passage below the conical sealing surface of the safety check valve is cylindrical, the expanding steam produces a more or less effective vapor lock and thus interferes with the unhampered drainage of the condensate water.

The bottom half of the capsule, which is made preferably from turnings produced on automatic lathes, is dimensioned such that the inlet ports permit engagement by the tool, e.g., a pin wrench. The formerly needed hexagonal wrench is thus eliminated. This, in conjunction with the fact that it increases the wall thickness, thereby contributing to stability, simultaneously results in an enlargement of the surfaces in contact with the diaphragm, which are brought so close to the valve body that only a small annular gap remains between the inner wall of the casing and the valve body. Diaphragm failures due to overloading have thus been greatly reduced.

BRIEF DESCRIPTION OF THE DRAWING

An embodiment of the invention is represented in the drawing, wherein.

DETAILED DESCRIPTION OF A PREFERRED EMBODIMENT

Figure 1:
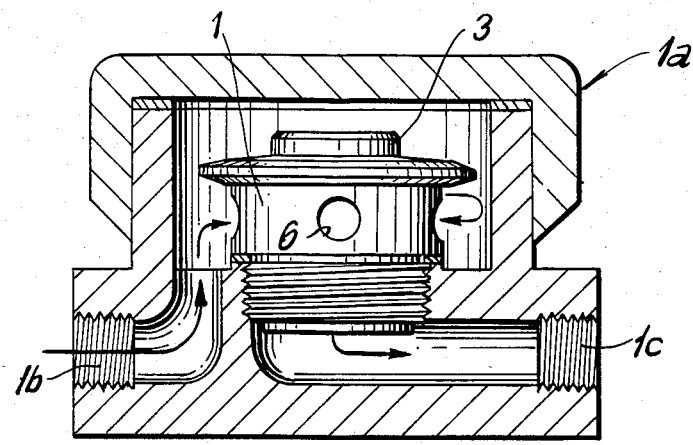
FIG. 1 represents an encapsulated diaphragm valve in a condensate drain or steam trap.
Figure 2:
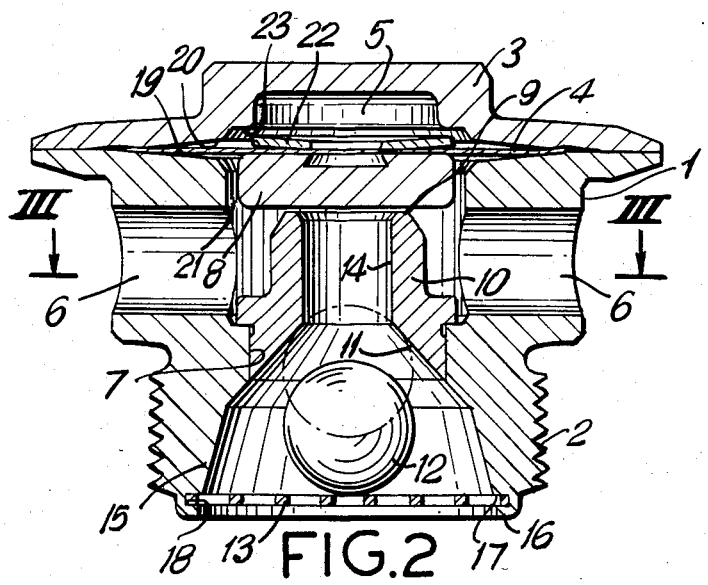
FIG. 2 is a cross-sectional view of an encapsulated diaphragm valve.
Figure 3:
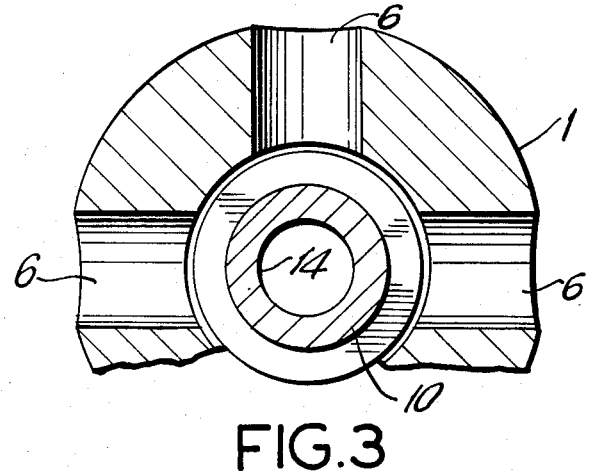
FIG. 3 is a cross section taken along line III—III of FIG. 2.

The encapsulated diaphragm valve controlling a condensate drain consists of a two-part, massive casing of unhardened free-cutting steel, namely a bottom part 1 with the threaded stem 2 to be driven into a condensate drain or steam trap 1a which has an inlet 1b and an outlet 1c. It also comprises an upper part 3 which, together with the diaphragm 4, forms a chamber 5 for containing the volatile liquid. In the bottom part of the capsule are four inlet ports 6 in a star arrangement, and a central outlet bore 7. The outlet bore 7 is controlled by a valve body 8 which is fastened in a hermetic and leak-proof manner to the diaphragm 4.

The diaphragm provided between the bottom capsule part 1 and the upper capsule part 3 is welded at its outer margin to the outer margins of the two capsule parts 1 and 3. In accordance with the invention, the valve body 8, which consists preferably of a valve plate, cooperates with the valve seat 9 on a valve seat body 10 force-fitted into the bore 7 in the bottom part of the capsule. On its outlet side the valve seat body has a conical seat 11 for a check valve ball 12.

The opening movement of the check valve 12 is limited by a sieve plate 13. The conical valve seat 11 which adjoins the bore 14 of the valve seat body 10 is prolonged at the outlet end in the threaded stem 2, flaring uniformly all the way to the end 15 of the stem, so that the entire conical flare in the threaded stem 2 forms the chamber to accommodate the movement of the check valve body 12.

The threaded stem end 15 terminates at its greatest width in an annular lip 16 which is bent inwardly and forms together with a shoulder 17 an annular groove 18 in which the sieve plate 13 is mounted.

The valve seat body 10 press-fitted in the central bore 7 of the bottom capsule part 1 consists of a hardened steel body ground at the valve seat 9, which extends over the entire width of the inlet ports 6 and thus provides for the uniform distribution across the valve body of the condensate flowing horizontally against it.

The dimensions of the massive capsule body 1 and of its inlet ports 6 in accordance with the present invention has the advantage that, on the basis of the achieved stability and of the expanded inlet bores running transversely of the movement of the valve body 8, the installation and removal of the diaphragm valve capsule can be performed by means of a pin wrench engaging the inlet ports. The inlet ports run toward the centrally disposed valve seat body 10, and their diameter corresponds approximately to the wall thickness of the capsule body in this area. The top and bottom of the ports are approximately in the same plane as the valve seat 9 on the inlet side and the valve seat 11 on the outlet side, respectively, thus achieving the maximum cross section of the inlet ports 6. The dimensions of the capsule casing give the capsule sufficient stability and strength despite the large cross sections of the inlet ports 6, so that the forces produced by the tightening and removal of the threaded stem 2 have no adverse effect on the material structure and thus on precise operation.

The surfaces 19 and 20 provided for limiting the movement of the diaphragm 4 as the valve opens and closes can be brought all the way up to the valve body 8, since the valve seat did not have to be machined from the solid material, so that only a narrow annular gap 21 remains that is necessary to allow the movement of the valve body. This measure contributes greatly towards limiting the number of diaphragm failures.

The special configuration of the inlet ports 6 and the resultant thickness of the wall of the capsule body, which extends all the way to the area where the diaphragm is clamped, serves a dual purpose in that on the one hand it permits the engagement of the tool in the inlet ports, and on the other hand it enlarges the diaphragm supporting surfaces.

Lastly, to further extend the life of the diaphragm, the snap ring 22 in the pressure chamber is made from a flat plate spring which in the open position resiliently engages an annular shoulder 23 on the upper part 3 of the capsule. In this manner not only is the cost considerably reduced in comparison to the star washers otherwise used, but also the wear on the diaphragm 4 is reduced.

I claim:

1. A low-profile encapsulated diaphragm valve as a control element for a thermally controlled steam condensate drain, comprising: an upper and a lower massive capsule part welded together at outer margins thereof, said capsule parts being unhardened turnings, a diaphragm clamped in a hermetic and leak-proof manner between said margins, said upper capsule part being of a hat-shaped configuration and together with the diaphragm forming a chamber for receiving a voltile liquid; said lower capsule part comprising: a threaded stem to be threaded into a bore in a casing of a drain, lateral inlet ports for steam water, said lower capsule part above the threaded stem in the area of the inlet ports including a cylindrical body, a valve body, and a controlled outlet opening; said lower capsule part including a first portion extending from said outer margins to closely adjacent said valve body and said upper capsule part including a second portion extending from said outer margins to at least closely adjacent to said valve body, said first and second portions defining means for supporting said diaphragm, said first extending portion being spaced from said valve body to define a free annular gap between said valve body and said lower capsule part to permit working movement of said valve body, a valve seat body being held in a press fit in a bore of said lower capsule part and having first and second valve seats respectively at inlet and outlet ends thereof, the outlet end of said valve seat body cooperating with a check valve body, a sieve plate limiting the opening movement of said check valve body, and through-bore in the valve seat body flaring towards the outlet end, continuing conically in the outlet opening of said lower capsule part beyond the valve seat body and being simultaneously a chamber for the movement of the check valve body, said inlet ports being bores which extend transversely of said cylindrical body, said bores having a top edge lying closely adjacent to a plane containing said first valve seat and a bottom edge lying closely adjacent to a plane containing said second valve seat whereby said inlet ports form a tool engaging means.

2. An encapsulated diaphragm valve according to claim 1, wherein said threaded stem terminates in a narrow annular lip in the area of greatest width of the conical outlet chamber.

3. An encapsulated diaphragm valve according to claim 2, wherein the narrow annular lip is bent inwardly at the free end of the threaded stem and, together with a shoulder provided at the flaring outlet chamber forms an annular groove in which said sieve plate is mounted.

4. An encapsulated diaphragm valve according to claim 1, comprising a plate spring welded to said diaphragm and to said valve body in the pressure chamber of the capsule and serving as a movement limiter, said spring in the open position thrusting against an annular shoulder on said upper capsule part.

5. A thermal control element for steam traps comprising: an upper and a lower massive capsule part welded together at outer margins thereof, a valve body, a first valve seat, a diaphragm clamped in a hermetic and leak-proof manner between said outer margins and co-operating via said valve body with said said valve seat, said upper capsule part being of a hat-shaped configuration and together with the diaphragm forming a chamber for receiving a volatile liquid; said lower capsule part comprising: a threaded stem to be threaded into a bore in a casing of a drain, lateral inlet ports for steam water, a second valve seat, and a controlled outlet opening; said lower capsule part above the threaded stem in the area of the inlet ports consisting of a cylindrical body, the wall thickness of said body in said area being approximately equal to the radius of a central working chamber for said valve body and said first valve seat, said inlet ports being bores extending transversely and approximately centrally to said cylindrical valve body, said bores having a diameter corresponding approximately to the wall thickness of the cylindrical body in said area, said bores having a top edge lying approximately in a plane with said first valve seat and a bottom edge lying approximately in a plane with said second valve seat, said inlet ports forming tool engaging means.

* * * * *